(12) United States Patent
Altunbasak et al.

(10) Patent No.: US 7,738,698 B2
(45) Date of Patent: Jun. 15, 2010

(54) METHOD AND APPARATUS FOR ADJUSTING THE CONTRAST OF AN IMAGE

(75) Inventors: Yucel Altunbasak, Norcross, GA (US); Tarik Arici, Marietta, GA (US); Toygar Akgun, Atlanta, GA (US)

(73) Assignee: Vestel Elektronik Sanayi Ve Ticaret A.S., Organize Sanayi Bolgesi (TR)

( * ) Notice: Subject to any disclaimer, the term of this patent is extended or adjusted under 35 U.S.C. 154(b) by 894 days.

(21) Appl. No.: 11/340,913

(22) Filed: Jan. 26, 2006

(65) Prior Publication Data

US 2007/0172145 A1 Jul. 26, 2007

(51) Int. Cl.
G06T 5/40 (2006.01)
(52) U.S. Cl. .................................. 382/169; 382/274
(58) Field of Classification Search ............... 382/168, 382/169, 274
See application file for complete search history.

(56) References Cited

U.S. PATENT DOCUMENTS

| | | | |
|---|---|---|---|
| 4,731,863 A | | 3/1988 | Sezan |
| 6,049,626 A | * | 4/2000 | Kim .......................... 382/167 |
| 6,157,748 A | * | 12/2000 | Taleblou et al. ............. 382/288 |
| 6,236,751 B1 | * | 5/2001 | Farrell ........................ 382/168 |
| 7,382,414 B2 | * | 6/2008 | Nakajima et al. ........... 348/625 |
| 2003/0161549 A1 | * | 8/2003 | Lei et al. ..................... 382/274 |

FOREIGN PATENT DOCUMENTS

| | | |
|---|---|---|
| EP | 0 501 728 A2 | 9/1992 |
| EP | 1 022 679 A2 | 7/2000 |
| EP | 1 482 447 A1 | 12/2004 |
| EP | 1 605 406 A2 | 12/2005 |

OTHER PUBLICATIONS

Gonzalez and Woods. "Digital Image Processing." Addison-Wesley Publishing Company, 1992, pp. 173-180.*
J. Alex Stark, Adaptive Image Contrast Enhancement Using Generalizations of Histogram Equalization, IEEE Transactions on Image Processing, vol. 9, No. 5, May 2000 (pp. 889-896).
R.C. Gonzales and Richard E. Woods, Digital Imaging Processing; Prentice Hall, New Jersey (2001), Chapter 3 Image Enhancement in the Spatial Domain, Section 3.3 Histogram Processing (pp. 88-95).
Stephen M. Pizer, et al., Adaptive Histogram Equalization and Its Variations; Computer Vision, Graphics, and Image Processing 39, 1987 (pp. 355-368).
European Search Report for Application No. EP 06 25 1101, dated Nov. 20, 2006, (4 pages).

* cited by examiner

*Primary Examiner*—Jon Chang
(74) *Attorney, Agent, or Firm*—Conley Rose, P.C.

(57) ABSTRACT

A method and apparatus for adjusting the contrast of an image, in which each pixel in the image has an initial brightness level that is within a range of brightness levels between a minimum brightness level and a maximum brightness level. For each brightness level within the range, the number of pixels that have the same initial brightness level is counted. The pixels are divided into at least two types by identifying the or each set of pixels having initial brightness levels in which each of a plurality of adjacent ones of said brightness levels has more pixels than a threshold number. The pixels of the plurality of adjacent ones of said brightness levels are treated as a first type. The remaining pixels are treated as a second type. For the or each set of pixels of the first type, contrast enhancement is carried out separately on those pixels.

36 Claims, 6 Drawing Sheets

METHOD AND APPARATUS FOR ADJUSTING THE CONTRAST OF AN IMAGE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates to a method and apparatus for adjusting the contrast of an image.

BACKGROUND OF THE INVENTION

A number of techniques are known for adjusting the contrast of an image, particularly in order to improve the contrast and therefore visibility of the image. Contrast adjustment or enhancement of images, particularly digital images, is used in many fields, including enhancing the contrast of a digital image for display by a television receiver or other display device, for printing by a printer, in digital cameras, etc., etc. Contrast enhancement is used to improve the contrast in medical and other images.

A known technique is so-called histogram equalisation. A discussion of histogram equalisation can be found in for example "Digital Image Processing", Prentice Hall, New Jersey, 2001, by R. C. Gonzalez & Richard E. Woods. Histogram equalisation is based on the assumption that an image having good contrast has pixels having brightness levels that are generally equally distributed over the range of possible brightness levels that can be displayed by the display device, printed by the printer, etc. Individual pixels retain their brightness order (i.e. they remain brighter or darker than other pixels). However, the values of the brightness levels of the individual pixels are adjusted so that they are equally distributed over the brightness scale.

Referring to FIG. 1, in histogram equalisation the brightness levels of the input digital image are subject to histogram generation 1 in which a histogram of the brightness levels of the pixels is generated. Then a cumulative distribution function is generated from the histogram 2. The cumulative distribution function is normalised as necessary to the available dynamic range of the display device, printer, etc. For example, the dynamic range may have 256 grey levels. This normalised cumulative distribution function is then used to map the brightness levels of the input digital image to brightness levels of an output image 3, which can then be passed for display, printing, etc. Histogram equalisation enhances the contrast for brightness values that are close to maxima in the histogram and decreases contrast near the minima. In other words, histogram equalisation improves the contrast in the image in areas of poor contrast at the expense of those areas where there is already good contrast.

A particular limitation of histogram equalisation is that large peaks in the histogram can be caused by large areas of similar brightness. Frequently, these correspond to areas of background which are often uninteresting. In any event, the effect of histogram equalisation can be over-enhancement and increased noise visibility. In the case where the histogram contains tall peaks, the generated cumulative distribution function becomes steep and brightness levels in the input image that are close to each other can be mapped to output brightness levels that are far from each other.

A number of techniques for overcoming this over-enhancement problem are known. For example, a modified cumulative distribution function is disclosed in "Adaptive Image Contrast Enhancement Using Generalizations of Histogram Equalization", by J. Alex Stark in IEEE Transactions on Image processing, vol. 9, no. 5, May 2000. Referring to FIG. 2, the generated histogram 4 is subject to a modified cumulation function 5 that weighs the histogram values. This weighing function is inversely proportional to the distance from the current pixel brightness level. In this way, large changes in the cumulation function 5 are avoided, such that the mapping 6 does not change the characteristics of the image severely. Nevertheless, a problem with this modified technique is that the weighing functions must be chosen in advance, and no single weighing function is sufficient to create a mapping that will avoid over-enhancement for all images. For example, for an input image that has extremely narrow peaks in the histogram of brightness levels, the weighing function must be adjusted accordingly. However, adjusting the weighing function to deal with narrowly peaked histograms will not give satisfactory visual results when the histogram is not narrowly peaked and the dynamic range is wider.

SUMMARY OF THE INVENTION

According to a first aspect of the present invention, there is provided a method of adjusting the contrast of an image formed of pixels in which each pixel has an initial brightness level that is within a range of brightness levels between a minimum brightness level and a maximum brightness level, the method comprising, for at least some of the pixels in the image: for each of the brightness levels within said range, counting the number of said pixels that have the same initial brightness level; dividing said pixels into at least two types by identifying the or each set of pixels having initial brightness levels in which each of a plurality of adjacent ones of said brightness levels has more pixels than a threshold number, the pixels of said plurality of adjacent ones of said brightness levels being a first type, the remaining pixels being a second type; and, separately for the or each set of pixels of the first type, performing contrast enhancement on the pixels that make up the set.

Thus, the pixels are (notionally) divided into at least first and second types. The first type are the pixels that have initial brightness levels that are "clustered" and each contain more pixels than the threshold number. In other words, where for example a histogram of the initial brightness levels of the pixels is formed, the histogram is divided into one or more contiguous "Type I" regions in which each adjacent brightness level contains more pixels than the threshold number. These Type I regions indicate the presence of dominant objects in the image and thus the regions where contrast enhancement is preferentially applied. Contrast enhancement is then carried out on the pixels of the Type I regions, the pixels of each Type I region being treated separately, and most preferably with contrast enhancement techniques that differ in detail and that are tailored to the characteristics of the pixels making up each Type I region.

In a preferred embodiment, the contrast enhancement that is performed on the pixels that make up the or each set of pixels of the first type is histogram equalisation.

The method may be carried out on all pixels in the image.

In the counting step, a histogram may be formed in which the number of pixels per brightness level is indicated, the method comprising smoothing said histogram prior to the dividing step. This smoothing helps to overcome the problem of histogram skew, which can arise for example because of quantisation when the image is initially digitised. The smoothing may be carried out by passing the values of the histogram through a low pass filter. The minimum and maximum brightness levels in said histogram after smoothing are preferably the same as the maximum and minimum initial brightness levels of said pixels.

The threshold number is preferably the average of the number of pixels per brightness level obtained in the counting step multiplied by a constant greater than 0 and less than or equal to 1. Typically, the constant is 1 though other values for the constant may be set. Indeed, other ways of determining the threshold are available.

In an embodiment, a linear transformation is applied to the initial brightness levels of the pixels of the second type. In this embodiment, the brightness levels pixels of the second type are thus subject to simple adjustment as necessary.

Preferably the method comprises, prior to the contrast enhancement step, expanding the range of brightness levels in the or each set of pixels of the first type. This helps to improve the contrast in the dominant objects indicated by these pixels being of the first type.

The method may comprise expanding the range of brightness levels in the or each set of pixels of the first type by a factor $(1+g.L\_R/D\_R)$, where g is a scalar multiplier, $L\_R$ is the range of brightness levels in the set and $D\_R$ is a measure of the dynamic range of brightness levels in the image.

$D\_R$ may be defined as $(1+P\_MAX-P\_MIN)$ where $P\_MAX$ is the maximum brightness level and $P\_MIN$ is the minimum brightness level.

More preferably, however, $D\_R$ is defined as $(1+P\_MAX-P\_MIN)$ where $P\_MAX$ is the maximum initial brightness level and $P\_MIN$ is the minimum initial brightness level exhibited by at least a predetermined percentage of said pixels, said predetermined percentage being less than 100%. Alternatively, preferably $D\_R$ is defined as $(1+P\_MAX-P\_MIN)$ where $P\_MIN$ is the minimum initial brightness level and $P\_MAX$ is the maximum initial brightness level exhibited by at least a predetermined percentage of said pixels, said predetermined percentage being less than 100%. Most preferably, $D\_R$ is defined as $(1+P\_MAX-P\_MIN)$, where $P\_MIN$ is the minimum initial brightness level exhibited by at least a first predetermined percentage of said pixels, and $P\_MAX$ is the maximum initial brightness level exhibited by at least a second predetermined percentage of said pixels, said first predetermined percentage being less than said second predetermined percentage and each of the first and second predetermined percentages being less than 100%. In any of these preferred embodiments, the dynamic range is made more robust to noise and better captures the actual dynamic range, especially if the tails of the histogram are small.

In an embodiment, said image is one image of a succession of images, the method being applied to the images of the succession of images using the same contrast enhancement until a sufficient change in the contrast of the images is detected, when a different contrast enhancement is applied to further images of the succession of images. Thus, for example, the same mapping for contrast enhancement can be used until a significant or sufficient scene change is detected.

According to a second aspect of the present invention, there is provided apparatus for adjusting the contrast of an image formed of pixels in which each pixel has an initial brightness level that is within a range of brightness levels between a minimum brightness level and a maximum brightness level, the apparatus comprising: a counter constructed and arranged to count, for at least some of the pixels in the image and for each of the brightness levels within said range, the number of said pixels that have the same initial brightness level; a classifier constructed and arranged to divide said pixels into at least two types by identifying the or each set of pixels having initial brightness levels in which each of a plurality of adjacent ones of said brightness levels has more pixels than a threshold number, the pixels of said plurality of adjacent ones of said brightness levels being a first type, the remaining pixels being a second type; and, a contrast enhancer constructed and arranged to perform contrast enhancement separately on the or each set of pixels of the first type.

In a preferred embodiment, the contrast enhancer is arranged such that the contrast enhancement that is performed on the pixels that make up the or each set of pixels of the first type is histogram equalisation.

The apparatus may be arranged to operate on all pixels in the image.

The counter may be arranged to form a histogram in which the number of pixels per brightness level is indicated, the apparatus comprising a smoother constructed and arranged to smooth said histogram prior to operation of the classifier. The smoother may be arranged to operate by passing the values of the histogram through a low pass filter. The smoother is preferably arranged so that the minimum and maximum brightness levels in said histogram after smoothing are the same as the maximum and minimum initial brightness levels of said pixels.

The threshold number is preferably the average of the number of pixels per brightness level obtained in the counting step multiplied by a constant greater than 0 and less than or equal to 1.

In an embodiment, the apparatus comprises a contrast enhancer constructed and arranged to apply a linear transformation to the initial brightness levels of the pixels of the second type.

The apparatus may comprise a range expander constructed and arranged to expand the range of brightness levels in the or each set of pixels of the first type prior to operation of the contrast enhancer.

The range expander may be arranged to expand the range of brightness levels in the or each set of pixels of the first type by a factor $(1+g.L\_R/D\_R)$, where g is a scalar multiplier, $L\_R$ is the range of brightness levels in the set and $D\_R$ is a measure of the dynamic range of brightness levels in the image.

$D\_R$ may be defined as $(1+P\_MAX-P\_MIN)$ where $P\_MAX$ is the maximum brightness level and $P\_MIN$ is the minimum brightness level.

More preferably, however, $D\_R$ is defined as $(1+P\_MAX-P\_MIN)$ where $P\_MAX$ is the maximum initial brightness level and $P\_MIN$ is the minimum initial brightness level exhibited by at least a predetermined percentage of said pixels, said predetermined percentage being less than 100%. Alternatively, preferably $D\_R$ is defined as $(1+P\_MAX-P\_MIN)$ where $P\_MIN$ is the minimum initial brightness level and $P\_MAX$ is the maximum initial brightness level exhibited by at least a predetermined percentage of said pixels, said predetermined percentage being less than 100%. Most preferably, $D\_R$ is defined as $(1+P\_MAX-P\_MIN)$, where $P\_MIN$ is the minimum initial brightness level exhibited by at least a first predetermined percentage of said pixels, and $P\_MAX$ is the maximum initial brightness level exhibited by at least a second predetermined percentage of said pixels, said first predetermined percentage being less than said second predetermined percentage and each of the first and second predetermined percentages being less than 100%.

In an embodiment, said image is one image of a succession of images, the apparatus comprising a scene change detector for detecting changes in contrast between images of the succession images, the apparatus being arranged to apply the same contrast enhancement to the images of the succession of images until a sufficient change in the contrast of the images is detected, when a different contrast enhancement is applied to further images of the succession of images.

According to a third aspect of the present invention, there is provided a method of adjusting the contrast of an image formed of pixels in which each pixel has an initial brightness level that is within a range of brightness levels between a minimum brightness level and a maximum brightness level, the method comprising, for at least some of the pixels in the image: for each of the brightness levels within said range, forming a histogram of the number of said pixels per brightness level in the original image;

dividing said pixels into at least two types by identifying the or each region in the histogram in which a plurality of adjacent ones of said brightness levels have more pixels than a threshold number, the pixels of said plurality of adjacent ones of said brightness levels being a first type, the remaining pixels being a second type; and, separately for the or each set of pixels of the first type, performing histogram equalisation contrast enhancement on the pixels that make up the set.

The method may comprise smoothing said histogram prior to the dividing step.

The threshold number is preferably the average of the number of pixels per brightness level obtained in the counting step multiplied by a constant greater than 0 and less than or equal to 1.

The method preferably comprises, prior to the contrast enhancement step, expanding the range of brightness levels in the or each set of pixels of the first type.

In an embodiment, a linear transformation is applied to the initial brightness levels of the pixels of the second type.

According to a fourth aspect of the present invention, there is provided apparatus for adjusting the contrast of an image formed of pixels in which each pixel has an initial brightness level that is within a range of brightness levels between a minimum brightness level and a maximum brightness level, the apparatus comprising: a histogram former constructed and arranged to form, for at least some of the pixels in the image and for each of the brightness levels within said range, a histogram of the number of said pixels per brightness level in the original image; a classifier constructed and arranged to divide said pixels into at least two types by identifying the or each region in the histogram in which a plurality of adjacent ones of said brightness levels have more pixels than a threshold number, the pixels of said plurality of adjacent ones of said brightness levels being a first type, the remaining pixels being a second type; and, a contrast enhancer constructed and arranged to perform histogram equalisation contrast enhancement on the pixels that make up the set separately for the or each set of pixels of the first type.

The apparatus may comprise a smoother constructed and arranged to smooth said histogram prior to operation of the classifier.

The threshold number is preferably the average of the number of pixels per brightness level obtained in the counting step multiplied by a constant greater than 0 and less than or equal to 1.

The apparatus preferably comprises a range expander constructed and arranged to expand the range of brightness levels in the or each set of pixels of the first type prior to operation of the contrast enhancer.

In an embodiment, the apparatus comprises a contrast enhancer constructed and arranged to apply a linear transformation to the initial brightness levels of the pixels of the second type.

The preferred apparatus and/or method may be incorporated into any apparatus and/or method that is used to enhance the contrast of a digital image, including for example an image processor used in a television set or the like, printers, digital image processing software, etc., etc. The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENTS

Figure 1:
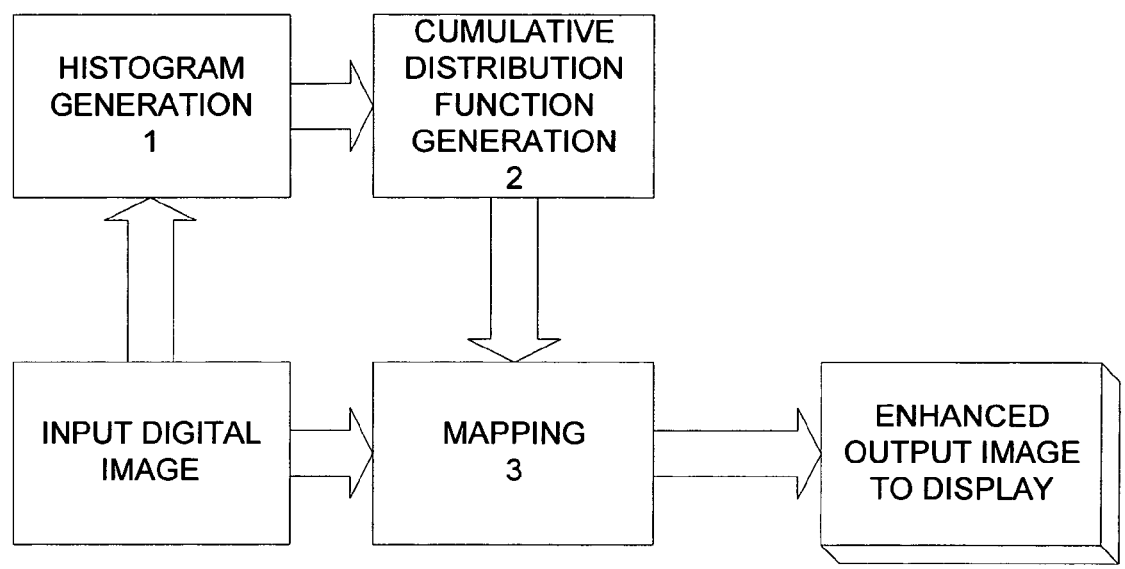
FIG. 1 and FIG. 2 show schematically two prior art contrast enhancement techniques.
Figure 2:
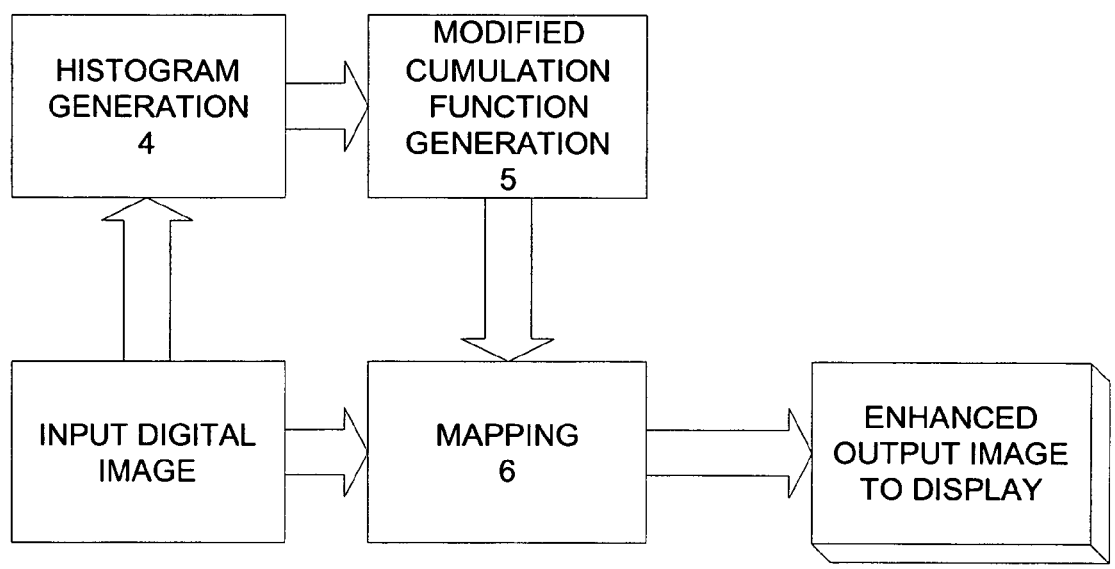
Figure 3:
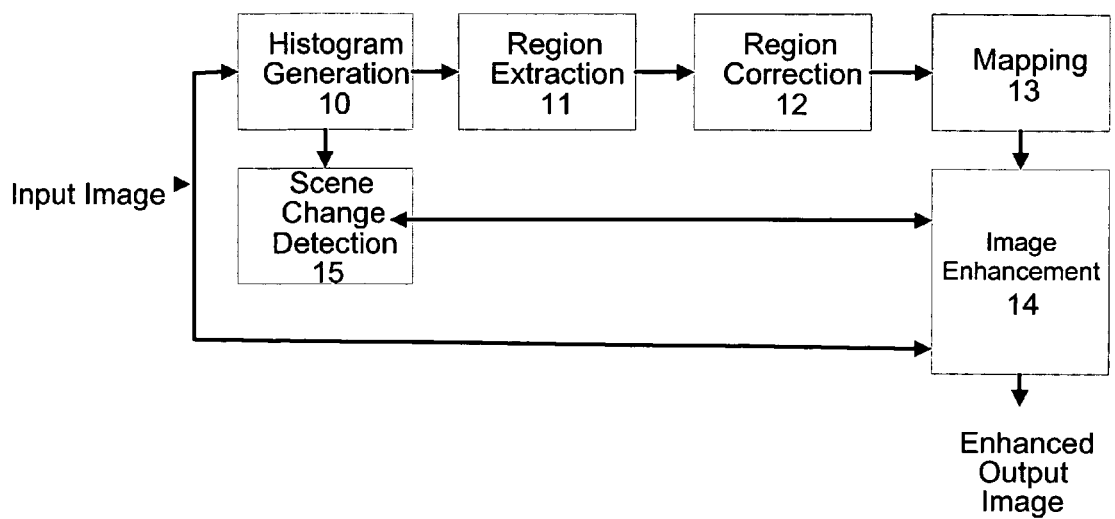
FIG. 3 schematically shows an overview of an example of a method in accordance with an embodiment of the present invention.

Referring first to FIG. 3, in overview a preferred example of an embodiment of the present invention operates as follows. From the brightness levels of the pixels in the input digital image, a histogram is generated 10. The histogram shows the number of pixels per brightness level or "bin". In a region extraction step 11, the histogram is divided into contiguous regions so that clustered pixel brightness levels are identified. Each of the regions is defined as a contiguous range of pixel brightness levels. These clustered pixel brightness levels indicate the existence of different dominant objects in the image if the magnitude of the relevant part of the histogram is larger than a threshold. The length of each region shows the dynamic range allocated to those objects in the image.

In order to enhance the contrast in these dominant objects, the dynamic range allocated to them in the input image is expanded by an expansion factor in a region correction step 12. The preferred expansion factor depends on the total dynamic range of the brightness levels of the input image and the length of the dynamic range. After the expansion operation on each region relating to the dominant objects, these regions are corrected in the region correction step 12 so that they are ordered according to the pixel brightness level without overlap and leaving out any pixel brightness levels in between the regions. In addition, all of the regions are shrunk if necessary by the same factor if the union of these regions does not fit in the displayable/printable range of pixel brightness levels. The number of available brightness levels depends on the display device, printer, etc., and may be for example 256 grey levels.

Using these corrected regions, a mapping is obtained 13. This mapping employs different types of enhancement depending on the type of the region. In a preferred embodiment, there are two types of regions. Type I corresponds to dominant objects and Type II to all remaining non-dominant objects in the image. For the Type I regions, the preferred mapping function uses histogram equalisation on the input image pixel brightness levels. Histogram equalisation is carried out so that the output pixel brightness levels produced from the dominant object's extracted region lie in the range that is produced after the correction operation corresponding to that region. On the other hand, linear mapping may be used for the Type II or non-dominant object regions so that the extracted non-dominant regions map to corresponding regions in the output image.

Using the obtained mapping, contrast in the image is enhanced in step 14. The same mapping can be used until a scene change is detected in step 15. In the preferred embodiment, a histogram-based scene change detector is used to detect scene changes. The same mapping is used until a new image belonging to a new scene as determined by the scene change detector arrives.

Figure 4:
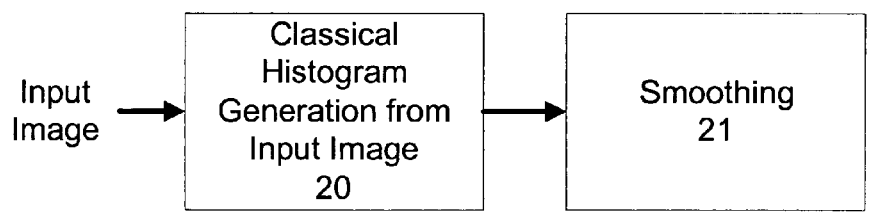
FIGS. 4 to 8 show schematically detailed steps in an example of a method according to an embodiment of the present invention; and, FIG. 9 shows schematically an example of a histogram produced during operation of a method in accordance with an embodiment of the present invention and how the histogram is treated.
Figure 9:
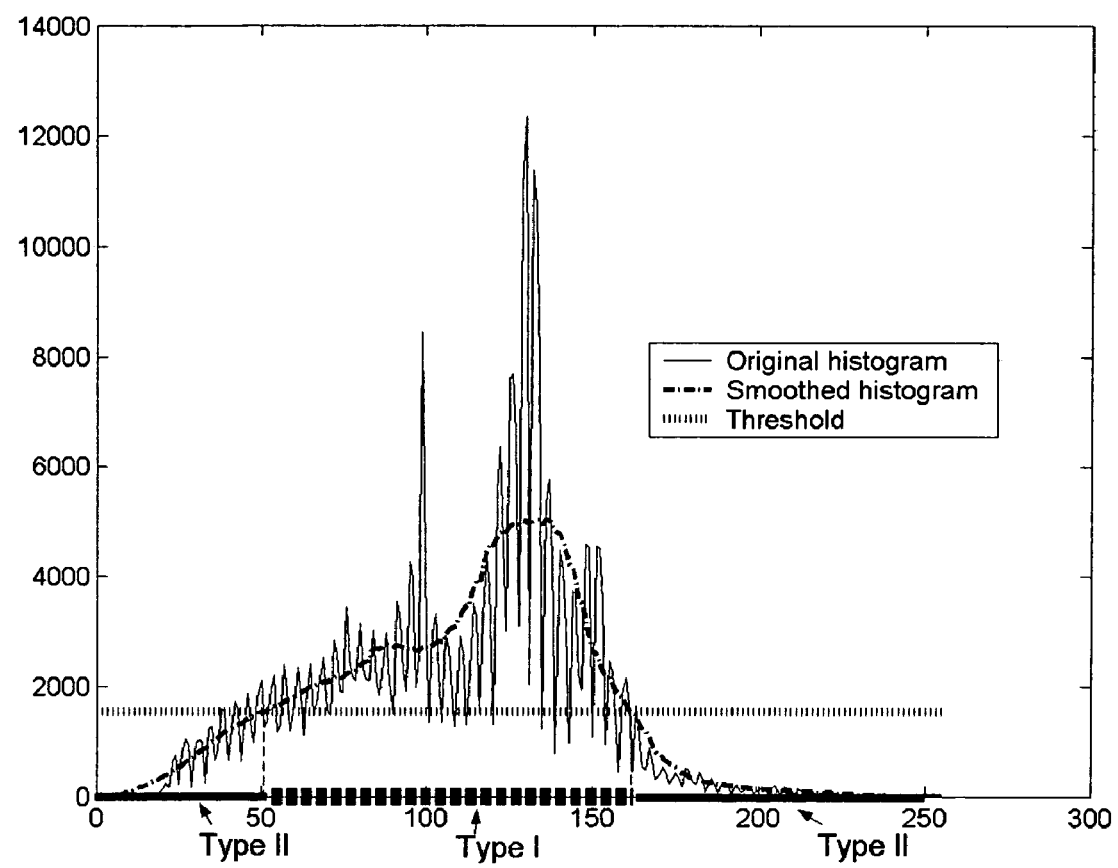

FIG. 4 shows schematically the steps carried out for the histogram generation 10 of FIG. 3 and FIG. 9 shows schematically an example of a histogram produced during operation of a method in accordance with an embodiment of the present invention and how the histogram is treated.

An initial raw histogram value for each pixel brightness level or "bin" is obtained by first counting the number of pixels having each pixel brightness level in step 20, the original histogram created thereby being shown as a solid line in FIG. 9. In practice, it is often found that the produced input histogram is skewed, typically at least in part because of the quantisation that takes place when the image is initially digitised. This problem manifests itself by the creation of a skewed histogram that has large magnitudes at some pixel brightness levels and very small or zero magnitudes in neighbouring brightness levels. This can be minimised by a smoothing step 21 in which the initial raw histogram is smoothed. It has been found that a simple window averaging method using a low. pass filter may be used for smoothing the initial raw histogram. In an example of a window averaging method, the value for the number of pixels in a current brightness level or bin is taken to be the average of a fixed number of bins to the left and to the right of the current bin. The boundary conditions are set so that the minimum and maximum observed pixel brightness levels in the input image are the same after the smoothing process. Mirroring can be used to handle out-of-boundary pixel brightness levels during the window averaging step. In other words, for cases where the current pixel brightness level is close or equal to zero or the maximum (e.g. 256), the neighbouring brightness level on one side may be absent. In mirroring, where for example the current pixel brightness level is equal to zero, the bin value to the left, equivalent to position −1, is equalised to the value of the bin position +1; the next bin value to the left, equivalent to position −2, is equalised to the value of the bin position +2; etc. The smoothed original histogram created thereby is shown as a dot-and-dash line in FIG. 9.

Figure 5:
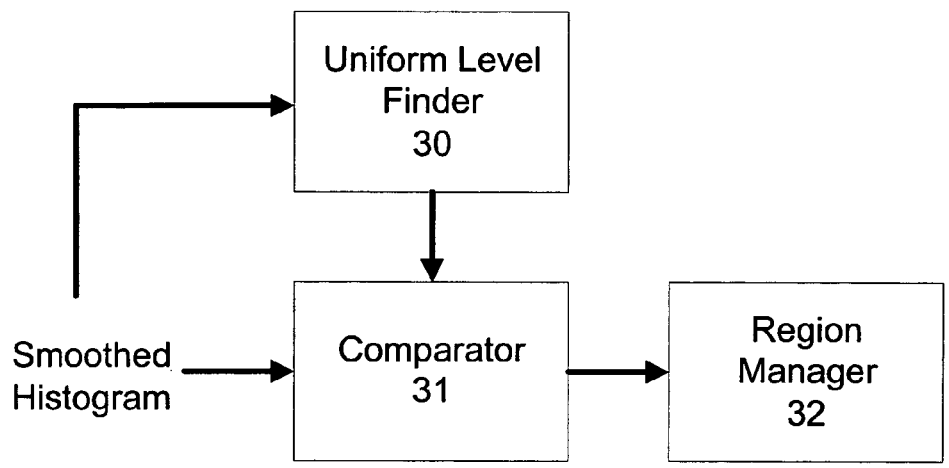

FIG. 5 shows schematically a preferred example of the region extraction step 11 of FIG. 3. The smoothed histogram is input to a level finder 30 which first finds the observed dynamic range. This observed dynamic range is used to calculate a threshold, which in this case is the average or uniform level of a uniformly distributed histogram, shown by a dotted line in FIG. 9. The uniform level corresponding to the observed dynamic range is obtained from the following relationship:

$$U\_L = s*M*N/D\_R$$

where s is a constant greater than 0 and less than or equal to 1, M is the number of lines in the input image, N is the number of pixels in a line, and D_R is the observed dynamic range of the input image.

The observed dynamic range D_R is conventionally equal to:

$$D\_R = P\_MAX - P\_MIN + 1$$

where P_MAX is the maximum pixel brightness level and P_MIN is the minimum pixel brightness level observed in the input image. However, more preferably, the value used for P_MIN is the minimum pixel brightness level exhibited by at least a certain percentage of the pixels in the input image, such as at least 0.05% or 0.1% or so. Similarly, the value used for P_MAX is the maximum pixel brightness level exhibited by at least a certain percentage of the pixels in the input image, such as at least 99.95% or 99.9% or so. In other words, when determining P_MIN and P_MAX to use in calculating the observed dynamic range, any brightness level having fewer/greater than the certain percentage of pixels is ignored. This makes the observed dynamic range D_R more robust to noise and better captures the actual dynamic range if the histogram tail values are very small.

Whilst the average or uniform level of a uniformly distributed histogram is preferably used as the threshold, other thresholds may be set. For example, the threshold may be a certain percentage, say 90%, of the average or uniform level of a uniformly distributed histogram.

The uniform level U_L is compared in a comparator 31 against the smoothed histogram and regions are started and ended as the histogram crosses the uniform level. Region manager 32 keeps track of the regions and deletes one point regions where the ending pixel brightness level comes immediately after the starting pixel brightness level. (In the simple example shown in FIG. 9, there is only one Type I region with a Type II region on either side. It will be understood however that in general there may be several Type I regions, which are separated from each other by Type II regions.)

Figure 6:
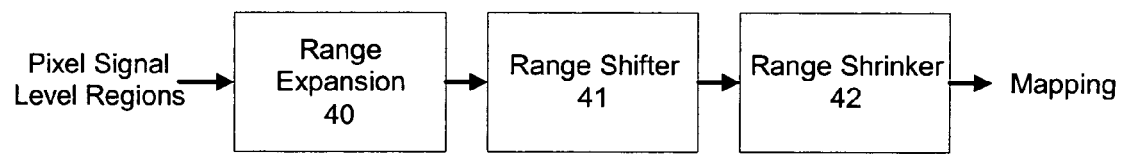

FIG. 6 shows schematically a preferred example of region correction step 12 in FIG. 3. In a range expansion step 40, the observed dynamic range is expanded only for dominant objects (i.e. the Type I regions). This expansion depends on the length of region and D_R. The following relationship can be used to find the expansion factor (E_Fi) for region i:

$$E\_F_i = (1 + g*L\_R_i/D\_R)$$

where $L\_R_i$ is the length of region i, and g is a scalar multiplier. g may be for example between about 0 and 3. It has been found that a value of 0.3 for g produces good results.

After the expansion operation, regions are shifted 41 in one direction to avoid overlap between different regions. Once each region is shifted so that there is no overlap, all of the regions are shifted together so that the middle pixel brightness levels of the newly obtained dynamic range and the input dynamic range coincide, if possible.

If after steps 40 and 41 the output dynamic range is larger than the available contrast range of the display device, printer, etc., (e.g. 256 grey levels), the output dynamic range is rescaled 42 accordingly.

Figure 7:
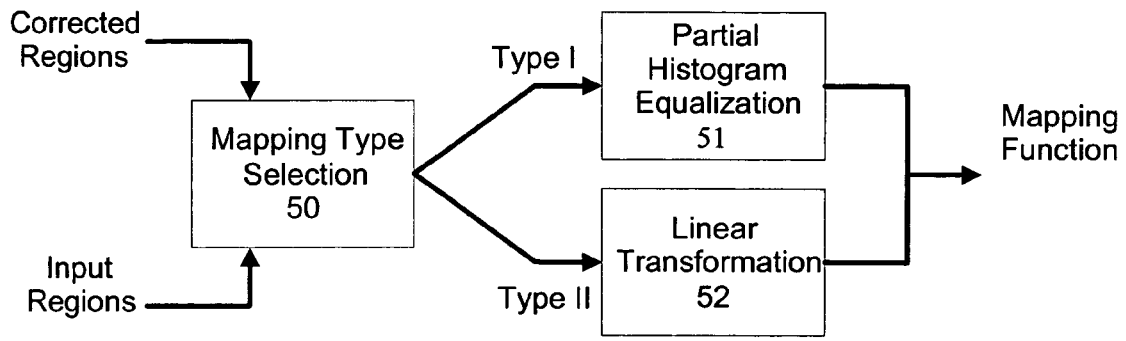

FIG. 7 shows schematically a preferred example of the mapping step 13 of FIG. 3. Mapping type is selected 50 depending on the type of the region. Input regions are mapped to corresponding output regions obtained by step 12 in FIG. 3. Whilst in general, any appropriate type of mapping may be used, preferably Type I regions are mapped using a partial histogram equalisation 51 in which only the part of the histogram that belongs to the or each respective Type I input region is used. In other words, for each Type I region, preferably histogram equalisation is used separately in which the cumulative distribution function defined only on that Type I region is used. Type II regions may be mapped to corrected output regions using a simpler transformation, such as a linear transformation 52 of the type y=a*x+b (where a and b are constants) so that xmin maps to ymin and xmax maps to ymax. Both in Type I and Type II mappings, the mapping for a region is performed so that minimum input pixel brightness level is mapped to the minimum output brightness level for that region, and likewise for the maximum input brightness level of that region. Upon the completion of this operation for all regions, the whole dynamic range of the input image is mapped to the specified output dynamic range. In the case where a thresholded dynamic range is utilised as described above, the remaining pixel levels outside the output dynamic range are located, ensuring that the monotonic order of the pixel brightness levels is maintained. If the contrast range of the display device, printer, etc. is exceeded, then clipping is performed.

Figure 8:
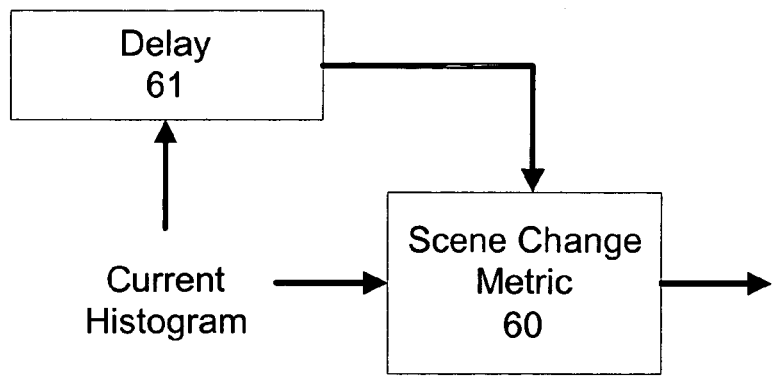

FIG. 8 shows schematically a preferred example of the two processing blocks in the scene change detection step 15 of FIG. 3. The preferred scene change detection uses a histogram-based scene change detection metric 60. An example of a formula that may be used for the distance metric D between two different histograms is:

$$D(h_1, h_2) = \frac{\sum_{1}^{256}(h_1(i) - h_2(i))^2}{\max(h_1(i), h_2(i))}$$

where $h_1$ is the histogram of the current image and $h_2$ is the histogram of a temporally earlier image. $h_2$ can be the histogram of the immediately previous image or other temporally earlier images which may be provided to the scene change metric step 60 by the use of a delay block 61. This metric therefore detects when there is a "significant" change in the brightness levels of temporally separated images. The amount of change that triggers a change in the mapping is determined by setting an appropriate value for D.

When the cumulative distribution function is created from the histogram during the histogram equalisation of the Type I regions, as in the prior art it is necessary to quantise or digitise the cumulative distribution function. The effect of this is that some brightness levels that are different in the input image are mapped to the same output brightness level, which implies a loss of (potential) detail for enhanced output image. Accordingly, in a variation, a histogram dithering method for the histogram equalisation is used. Upon obtaining the cumulative distribution function from a histogram, it is not quantised to an integer but rather kept as a floating-point number of a specified precision, say a.b where a is the integer part, and b is the fractional part. The output histogram ho is. created from input histogram hi by the formula below at each signal pixel level m:

$$h_o(m) = \sum_{1}^{R} h_i(n) * I(m = \text{floor}(CDF(n) * R)) + \sum_{1}^{R} h_i(n) * (m - \text{floor}(CDF(n)) * I(m = \text{ceil}(CDF(n) * R)),$$

where CDF(.) is the cumulative distribution function derived from the input image, R is the maximum number of pixel signal levels displayable by the display device or printer, etc., ceil(.) rounds up to the smallest larger integer, and floor(.) rounds down to the largest smaller integer. After obtaining the output histogram, a mapping is found so that obtained output histogram will be approximately matched using for example a histogram matching algorithm as given the book by R. C. Gonzalez & Richard E. Woods, entitled "Digital Image Processing", Prentice Hall, New Jersey, 2001.

Embodiments of the present invention have been described with particular reference to the examples illustrated. However, it will be appreciated that variations and modifications may be made to the examples described within the scope of the present invention.

What is claimed is:

1. Apparatus for adjusting the contrast of an image formed of pixels in which each pixel has an initial brightness level that is within a range of brightness levels between a minimum brightness level and a maximum brightness level, the apparatus comprising:
   a counter constructed and arranged to count, for at least some of the pixels in the image and for each of the brightness levels within said range, the number of said pixels that have the same initial brightness level;
   a classifier constructed and arranged to divide said pixels into at least two types by identifying the or each set of pixels having initial brightness levels in which each of a plurality of adjacent ones of said brightness levels has more pixels than a threshold number, the pixels of said plurality of adjacent ones of said brightness levels being a first type, the remaining pixels being a second type; and,
   a contrast enhancer constructed and arranged to perform contrast enhancement separately on the or each set of pixels of the first type, wherein the threshold number is the average of the number of pixels per brightness level obtained in the counting step multiplied by a constant greater than 0 and less than or equal to 1.

2. Apparatus according to claim 1, wherein the contrast enhancer is arranged such that the contrast enhancement that is performed on the pixels that makes up the or each set of pixels of the first type is histogram equalisation.

3. Apparatus according to claim 1, wherein the apparatus is arranged to operate on all pixels in the image.

4. Apparatus according to claim 1, wherein the counter is arranged to form a histogram in which the number of pixels per brightness level is indicated, the apparatus comprising a smoother constructed and arranged to smooth said histogram prior to operation of the classifier.

5. Apparatus according to claim 4, wherein the smoother is arranged to operate by passing the values of the histogram through a low pass filter.

6. Apparatus according to claim 4, wherein the smoother is arranged so that the minimum and maximum brightness levels in said histogram after smoothing are the same as the maximum and minimum initial brightness levels of said pixels.

7. Apparatus according to claim 1, comprising a contrast enhancer constructed and arranged to apply a linear transformation to the initial brightness levels of the pixels of the second type.

8. Apparatus according to claim 1, comprising a range expander constructed and arranged to expand the range of brightness levels in the or each set of pixels of the first type prior to operation of the contrast enhancer.

9. Apparatus according to claim 8, wherein the range expander is arranged to expand the range of brightness levels in the or each set of pixels of the first type by a factor (1=g.L_R/D_R), where g is a scalar multiplier, L_R is the range of brightness levels in the set and D_R is a measure of the dynamic range of brightness levels in the image.

10. Apparatus according to claim 9, wherein D_R is defined as (1=P_MAX−P_MIN) where P_MAX is the maximum brightness level and P_MIN is the minimum brightness level.

11. Apparatus according to claim 9, wherein D_R is defined as (1=P_MAX−P_MIN) where P_MAX is the maximum initial brightness level and P_MIN is the minimum initial brightness level exhibited by at least a predetermined percentage of said pixels, said predetermined percentage being less than 100%.

12. Apparatus according to claim 9, wherein D_R is defined as (1=P_MAX−P_MIN) where P_MIN is the minimum initial brightness level and P_MAX is the maximum initial brightness level exhibited by at least a predetermined percentage of said pixels, said predetermined percentage being less than 100%.

13. Apparatus according to claim 9, wherein DR is defined as (1=P_MAX−P_MIN), where P_MIN is the minimum initial brightness level exhibited by at least a first predetermined percentage of said pixels and P_MAX is the maximum initial brightness level exhibited by at least a second predetermined percentage of said pixels, said first predetermined percentage being less than said second predetermined percentage and each of the first and second predetermined percentages being less than 100%.

14. Apparatus according to claim 1, wherein said image is one image of a succession of images, the apparatus comprising a scene change detector for detecting changes in contrast between images of the succession images, the apparatus being arranged to apply the same contrast enhancement to the images of the succession of images until a sufficient change in the contrast of the images is detected, when a different contrast enhancement is applied to further images of the succession of images.

15. A method of adjusting the contrast of an image using apparatus according to claim 1, the image being formed of pixels and in which each pixel has an initial brightness level that is within a range of brightness levels between a minimum brightness level and a maximum brightness level, the method comprising, for at least some of the pixels in the image:
for each of the brightness levels within said range, counting with a counter the number of said pixels that have the same initial brightness level;
dividing using a classifier to divide said pixels into at least two types by identifying the or each set of pixels having initial brightness levels in which each of a plurality of adjacent ones of said brightness levels has more pixels than a threshold number, the pixels of said plurality of adjacent ones of said brightness levels being a first type, the remaining pixels being a second type; and,
using a contrast enhancer separately for the or each set of pixels of the first type, performing contrast enhancement on the pixels that make up the set, wherein the threshold number is the average of the number of pixels per brightness level obtained in the counting step multiplied by a constant greater than 0 and less than or equal to 1.

16. A method according to claim 15, wherein the contrast enhancement that is performed on the pixels that make up the or each set of pixels of the first type is histogram equalisation.

17. A method according to claim 15, wherein the method is carried out on all pixels in the image.

18. A method according to claim 15, wherein in the counting step, a histogram is formed in which the number of pixels per brightness level is indicated, and comprising smoothing said histogram prior to the dividing step.

19. A method according to claim 18, wherein the smoothing is carried out by passing the values of the histogram through a low pass filter.

20. A method according to claim 18, wherein the minimum and maximum brightness levels in said histogram after smoothing are the same as the maximum and minimum initial brightness levels of said pixels.

21. A method according to claim 15, comprising applying a linear transformation to the initial brightness levels of the pixels of the second type.

22. A method according to claim 15, comprising, prior to the contrast enhancement step, expanding the range of brightness levels in the or each set of pixels of the first type.

23. A method according to claim 22, comprising expanding the range of brightness levels in the or each set of pixels of the first type by a factor (1=g.L_R/D_R), where g is a scalar multiplier, L_R is the range of brightness levels in the set and D_R is a measure of the dynamic range of brightness levels in the image.

24. A method according to claim 23, wherein D_R is defined as (1=P_MAX−P_MIN) where P_MAX is the maximum brightness level and P_MIN is the minimum brightness level.

25. A method according to claim 23, wherein D_R is defined as (1=P_MAX−P_MIN) where P_MAX is the maximum initial brightness level and P_MIN is the minimum initial brightness level exhibited by at least a predetermined percentage of said pixels, said predetermined percentage being less than 100%.

26. A method according to claim 23, wherein D_R is defined as (1=P_MAX−P_MIN) where P_MIN is the minimum initial brightness level and P_MAX is the maximum initial brightness level exhibited by at least a predetermined percentage of said pixels, said predetermined percentage being less than 100%.

27. A method according to claim 23, wherein D_R is defined as (1=P_MAX−P_MIN), where P_MIN is the minimum initial brightness level exhibited by at least a first predetermined percentage of said pixels, and P_MAX is the maximum initial brightness level exhibited by at least a second predetermined percentage of said pixels, said first predetermined percentage being less than said second predetermined percentage and each of the first and second predetermined percentages being less than 100%.

28. A method according to claim 15, wherein said image is one image of a succession of images, the method being applied to the images of the succession of images using the same contrast enhancement until a sufficient change in the contrast of the images is detected, when a different contrast enhancement is applied to further images of the succession of images.

29. Apparatus for adjusting the contrast of an image formed of pixels in which each pixel has an initial brightness level that is within a range of brightness levels between a minimum brightness level and a maximum brightness level, the apparatus comprising:

a histogram former constructed and arranged to count and form, for at least some of the pixels in the image and for each of the brightness levels within said range, a histogram of the number of said pixels per brightness level in the original image;

a classifier constructed and arranged to divide said pixels into at least two types by identifying the or each region in the histogram in which a plurality of adjacent ones of said brightness levels have more pixels than a threshold number, the pixels of said plurality of adjacent ones of said brightness levels being a first type, the remaining pixels being a second type; and, a contrast enhancer constructed and arranged to perform histogram equalisation contrast enhancement on the pixels that make up the set separately for the or each set of pixels of the first type, wherein the threshold number is the average of the number of pixels per brightness level obtained in the counting step multiplied by a constant greater than 0 and less than or equal to 1.

30. Apparatus method according to claim 29, comprising a smoother constructed and arranged to smooth said histogram prior to operation of the classifier.

31. Apparatus according to claim 29, comprising a range expander constructed and arranged to expand the range of brightness levels in the or each set of pixels of the first type prior to operation of the contrast enhancer.

32. Apparatus according to claim 29, comprising a contrast enhancer constructed and arranged to apply a linear transformation to the initial brightness levels of the pixels of the second type.

33. A method of adjusting the contrast of an image using apparatus according to claim 29, the image being formed of pixels and in which each pixel has an initial brightness level that is within a range of brightness levels between a minimum brightness level and a maximum brightness level, the method comprising, for at least some of the pixels in the image:

using a histogram former, for each of the brightness levels within said range, counting pixels and forming a histogram of the number of said pixels per brightness level in the original image;

using a classifier, dividing said pixels into at least two types by identifying the or each region in the histogram in which a plurality of adjacent ones of said brightness levels have more pixels than a threshold number, the pixels of said plurality of adjacent ones of said brightness levels being a first type, the remaining pixels being a second type; and, using a contrast enhancer, separately for the or each set of pixels of the first type, performing histogram equalisation contrast enhancement on the pixels that make up the set, wherein the threshold number is the average of the number of pixels per brightness level obtained in the counting step multiplied by a constant greater than 0 and less than or equal to 1.

34. A method according to claim 33, comprising smoothing said histogram prior to the dividing step.

35. A method according to claim 33, comprising, prior to the contrast enhancement step, expanding the range of brightness levels in the or each set of pixels of the first type.

36. A method according to claim 33, comprising applying a linear transformation to the initial brightness levels of the pixels of the second type.

\* \* \* \* \*